(12) United States Patent
Yoshino et al.

(10) Patent No.: US 7,717,203 B2
(45) Date of Patent: May 18, 2010

(54) WHEEL ROTATING APPARATUS AND IN-WHEEL MOTOR VEHICLE

(75) Inventors: Tsutomu Yoshino, Saitama (JP); Koichi Oku, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 442 days.

(21) Appl. No.: 11/896,126

(22) Filed: Aug. 29, 2007

(65) Prior Publication Data

US 2008/0070736 A1 Mar. 20, 2008

(30) Foreign Application Priority Data

Aug. 29, 2006 (JP) ............................. 2006-231499

(51) Int. Cl.
*B60K 7/00* (2006.01)

(52) U.S. Cl. .................. 180/65.51; 180/65.6; 903/910; 475/5; 475/149

(58) Field of Classification Search ............. 180/65.51, 180/65.6, 65.7; 903/909, 910; 475/4, 5, 475/10, 149, 154
See application file for complete search history.

(56) References Cited

U.S. PATENT DOCUMENTS

| 5,382,854 A * | 1/1995 | Kawamoto et al. ......... 310/67 R |
| 6,974,399 B2 * | 12/2005 | Lo ................................. 475/5 |
| 7,214,155 B2 * | 5/2007 | Mueller et al. ................ 475/5 |
| 7,556,580 B2 * | 7/2009 | Saito et al. ................. 475/154 |

FOREIGN PATENT DOCUMENTS

| JP | 2849201 B2 | 11/1998 |
| JP | 2005-81871 A | 3/2005 |

* cited by examiner

*Primary Examiner*—Lesley Morris
*Assistant Examiner*—John D Walters
(74) *Attorney, Agent, or Firm*—Birch, Stewart, Kolasch & Birch, LLP

(57) ABSTRACT

In a wheel rotating apparatus including a motor and a planet gear mechanism to generate a drive force, the planet gear includes first and second gears having different diameters, connected to each other in an axial direction thereof with planet gear shaft. The first gear is inside the stator and the rotor in radial and axial directions of the wheel and the second gear is outside the first gear in an axial direction of the wheel. A vehicle may include a suspension connected to the base of the wheel rotating apparatus.

18 Claims, 10 Drawing Sheets

WHEEL ROTATING APPARATUS AND IN-WHEEL MOTOR VEHICLE

CROSS REFERENCE TO RELATED APPLICATIONS

This application claims the foreign priority benefit under Title 35, United States Code, §119(a)-(d) of Japanese Patent Application No. 2006-231499, filed on Aug. 29, 2006 in the Japan Patent Office, the disclosure of which is herein incorporated by reference in its entirety.

BACKGROUND OF THE INVENTION

1. Field of the Invention

The present invention relates to a wheel rotating apparatus having a planet gear unit with a high reduction ratio and an in-wheel motor vehicle including the wheel rotating apparatus.

2. Description of the Related Art

There are two types of driving method of in-wheel motor vehicles, namely, a direct drive motor method and a geared motor method.

In the direct drive motor method, an output shaft of a motor is directly coupled to a drive shaft (hub) of a wheel. This method has an advantageous effect in reducing a weight by decreasing the number of parts due to absence of a reducer, but a disadvantageous effect in: a size because the motor becomes large to have a large torque arm; output efficiency; and a dynamic performance.

In the geared motor method, an output of the motor is transmitted to a driving shaft of a wheel after reducing a rotation speed of the motor output. This increases a torque of the motor output with the reducer, improving the dynamic performance by an increased output efficiency with the motor miniaturized. However, the presence of the reducer between the wheel and the motor requires a housing space for the reducer and accessories for supplying oil, resulting in a large size of the apparatus.

In consideration of this, a geared motor method using a planet gear mechanism as a compact reducer is known. JP2849201 and JP2005-81871A disclose such geared methods.

Particularly, JP2005-81871A discloses a technology in which a planet gear reducer, having planet gear members with different diameter gears, is arranged in line with the motor in an axial direction, wherein a break mechanism is disposed on an outer circumferential side of the planet gear with a smaller diameter to efficiently use the space.

SUMMARY OF THE INVENTION

A first aspect of the present invention provides a wheel rotating apparatus for rotating a wheel, having a rim and a predetermined inner space defined by a circumference face of the rim, to generate a driving force, comprising: a base to be supported by a body; a motor, in the inner space, including: a stator fixed to the base: a rotor facing the stator along the circumferential direction of the wheel, the stator and the rotor being housed along the rim inside the rim in a radial direction of the wheel; and a motor output shaft inside the stator and the rotor in the radial direction for generating a rotation force at the motor output shaft; a planet gear unit in the inner space, disposed inside the rotor and the stator in the radial direction, including: a sun gear coupled to the motor output shaft; a planet gear; an inner gear coupled to the sun gear through the planet gear; and a planet gear unit output member; a wheel rotating member connected to the planet gear unit output member; a rotatably supporting member connected to the base for rotatably supporting the wheel rotating member and the sun gear from the base, the wheel being to be connected to the wheel rotating member, wherein the planet gear includes a first gear having a first diameter and a second gear, having a second diameter different from the first diameter, connected to the first gear in an axial direction thereof to have a unit body, the first gear is in an inside space defined by circumferential faces of the stator and the rotor and geared with the sun gear, and the second gear is outside the first gear in the axial direction relative to the body and geared with the inner gear.

According to the first aspect, the rotation force of the motor is transmitted to the wheel rotating member with a rotation speed reduced by the planet gear unit. This may miniaturize the motor and increase an output efficiency. Thus, a running performance such as an acceleration performance may be improved.

Further, a torque arm of the motor may be extended by disposing the stator and the rotor inside the wheel in a radial direction of the wheel along an inner circumferential face of the rim of the wheel. This may thin the motor. Thus, the stator and the rotor may be disposed more closer to an outer circumference of the wheel, which creates a space closer to a center of the wheel for disposing the planet gear unit. In other words, a structural part including the motor and the planet gear can be thinned. As the result, the motor and the planet gear unit can be housed in a space in the wheel.

Further, in the planet gear unit, a first gear and the second gear having different diameters are integrally formed, and thus a suitable reduction ratio can be obtained by determining appropriate gear diameters (the number of teeth) of the first and second gears. This may prevent a size of the motor from increasing with a load on the motor reduced, and thus the apparatus may be thinned in the axial direction of the wheel. In addition, the first gear may be disposed inside the stator and the rotor. This allows the planet gear unit to be housed in the axial direction of the wheel.

Thus, the motor and the planet gear unit may be housed within the inner space of the wheel without protrusion of the motor and the reducer from the wheel. This may make it easy to apply the present invention to steering wheels and can increase an effective space of a vehicle with increased variance of suspension geometry.

According to the present invention, the motor and the planet gear, being compact and lightened, are provided with a sufficient running performance.

A second aspect of the present invention based on the first aspect provides the wheel rotating apparatus further comprising an input flange for coupling the rotor to the sun gear to rotate the sun gear integrally with the rotor, wherein the inner gear is connected to the base.

According to the second aspect, the inner gear may be fixed to the motor housing, and the sun gear may be coupled to the rotor to be rotated integrally with the rotor, revolving the planet gear about the sun gear. The revolution movement may provide an output.

A third aspect of the present invention based on the second aspect provides the wheel rotating apparatus, wherein the sun gear and the input flange have sleeve shapes to have a continuous hollow portion therein, and the wheel rotating member and the rotatably supporting member are disposed in the hollow portion.

According to the third aspect, the wheel rotating member and the rotatably supporting member may be disposed in a sleeve hollow portion of the sun gear and the input flange. The wheel rotating member and the rotatably supporting member can support the sun gear and the input flange with a span which is long in the axial direction of the wheel. Thus, the sun gear and the input flange for receiving the rotation of the rotor can be stably supported. Further, according to the third aspect a variance in determining positions of the sun gear and the input flange is increased. Thus, a rotation balance in the rotor and the planet gear unit can be appropriately provided by appropriately determining the positions of the sun gear and the input flange. This can reduce an offset of a load on bearing.

A fourth aspect of the present invention based on the second aspect provides the wheel rotating apparatus, wherein the rotatably supporting member has a sleeve shape to have a hollow part therein, and the wheel rotating member has a shaft inserted into the hollow part and fitted into the hollow part with a bearing.

According to the fourth aspect, the wheel rotating member can be supported with a span which is long in the axial direction of the wheel. This may increase strength in supporting the wheel rotating member and the rotatably supporting member against an inclination of the wheel including a tire, stably supporting the wheel rotating member.

A fifth aspect of the present invention based on the second aspect provides the wheel rotating apparatus, wherein the wheel rotating member has a sleeve shape to have a hollow part therein, and the rotatably supporting member has a shaft inserted into the hollow part and fitted into the hollow part with a bearing.

According to the fifth aspect, the wheel rotating member can be supported with a span which is long in the axial direction of the wheel. This can stably support the wheel rotating member because strength in supporting the wheel rotating member and the rotatably supporting member against an inclination of the wheel including a tire can be increased.

A sixth aspect of the present invention based on the second aspect provides the wheel rotating apparatus, wherein the sun gear and the input flange are fitted over a unit, including the rotatably supporting member and the wheel rotating member, with an outer bearing having a first outer diameter and an inner bearing having a second outer diameter identical with the first diameter.

According to the sixth aspect, use of the bearings having the same diameter for the sun gear and the input flange can reduce the cost.

A seventh aspect of the present invention based on the second aspect provides the wheel rotating apparatus, wherein the wheel has a predetermined center of gravity, and the outer and inner bearings are disposed symmetrically about the predetermined center of gravity, and the planet gear unit and the motor have a combined center of gravity according substantially with the center of gravity of the wheel, when the wheel is attached to the wheel rotating member.

According to the seventh aspect, the outer and inner bearings may support a center of gravity of the wheel with a good balance and smooth rotation without vibrations and offset of impact load. This can improve endurance of the bearings. The center of gravity of the combination of the planet gear unit and the motor may be matched to the center of gravity of the wheel. Thus vibrations transmitted from the wheel can be transmitted to the suspension without loss. The suspension can absorb the vibration, reducing the vibrations on the side of the vehicle body and reducing loads of the vibration on parts in the wheel.

An eighth aspect of the present invention based on the second aspect provides the wheel rotating apparatus, wherein the second diameter is smaller than the first diameter.

According to the eighth aspect, the ratio in diameter between the first and second gears can provide a high variance in designing. For example, a higher reduction ratio may be provided.

The diameter of the second gear geared with the inner gear may be smaller than that of the first gear. This may provide a high reduction ratio with a larger teeth thickness of the inner gear than the case in which a first stage of planet gear would be used.

A ninth aspect of the present invention based on the second aspect provides the wheel rotating apparatus, wherein the sun gear has a third diameter, and the first diameter is smaller than the third diameter.

According to the ninth aspect, the number of sets of the planet gears can be determined in accordance with a ratio in diameter between the sun gear and the first gear, and thus the number of sets of the planet gears can be adjusted by determining diameters of the inner gear and the second gear. This can disperse the loads on the planet gears.

A tenth aspect of the present invention based on the second aspect provides the wheel rotating apparatus, wherein the inner gear is disposed outside the stator and the rotor in the axial direction of the wheel relative to the base and has an outer diameter smaller than an inner diameter of the stator.

According to the tenth aspect, the inner gear may be disposed outside the stator and the rotor in axial direction of the wheel, providing a sufficient thickness of teeth of the inner gear without limitation of the rotor inner diameters of the stator and the rotor.

Further, an outer diameter of the inner gear is made smaller than an inner diameter of the stator. This allows the motor housing from being assembled after assembling the gear assembly, providing a workability in assembling.

An eleventh aspect of the present invention based on the second aspect provides the wheel rotating apparatus, wherein the planet gear includes a gear shaft, as a rotation axis thereof, supporting the first and second gears, the planet gear unit includes a gear case and outer and inner bearings for rotatably supporting the gear shaft by the gear case, wherein one of the outer and inner bearings comprises a bearing for restricting a thrust movement of the gear shaft and the other of the outer and inner bearings comprises a bearing for allowing the thrust movement of the gear shaft.

According to the eleventh aspect, the bearing may be used which may allow movement in a thrust direction to relieve expansion in an axial direction of the gear shaft due to thermal expansion and a thrust load generated with rotation. This prevents stresses in the axial direction from being transmitted to the gear case. This prevents a weight of the gear case from increasing because there is no necessity to prevent a deformation of the gear case with a sufficient stiffness of the gear case.

A twelfth aspect of the present invention based on the second aspect provides the wheel rotating apparatus, wherein the outer bearing comprises a bearing for allowing the thrust movement of the gear shaft and the inner bearings comprises a bearing for restricting the thrust movement of the gear shaft.

According to the twelfth aspect, transmission of stresses in the axial direction to the gear case can be prevented by relieving expansion in the axial direction of the gear shaft due to thermal expansion and small thrust loads caused by rotation with the sun gear engaging with the first gear.

A thirteenth aspect of the present invention based on the second aspect provides the wheel rotating apparatus, wherein the outer bearing comprises a bearing for restricting the thrust movement of the gear shaft and the inner bearing comprises a bearing for allowing the thrust movement of the gear shaft.

According to the thirteenth aspect, transmission of stresses in the axial direction to the gear case can be prevented by relieving expansion in the axial direction of the gear shaft due to thermal expansion and small thrust loads caused by rotation with the sun gear engaging with the first gear.

A fourteenth aspect of the present invention based on the second aspect provides the wheel rotating apparatus, wherein the stator is disposed in the inside space in the radial direction of the wheel along the inner circumference of the rim, and the rotor is disposed inside the stator in the radial direction.

According to the fourteenth aspect, use of an inner rotor type of motor in which the rotor is disposed inside the stator can decrease a size in the radial direction of the wheel.

A fifteenth aspect of the present invention provides a vehicle comprising a suspension connected to the base of the wheel rotating apparatus based on the first aspect.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the above-mentioned related art will be further explained.

In the technology disclosed in JP2849201, it is necessary to increase a gear diameter of an inner gear and decrease a diameter of a sun gear in order to increase a reduction ratio because of a principle of the planet gear mechanism. In other words, the reduction ratio basically depends on a ratio of pitch circles of the sun gear and the inner gear. Thus, there is restriction in decreasing the gear diameter of the sun gear in strength and increase in a gear diameter (inner diameter) of the inner gear may increase a size of the apparatus. Further, in the technology disclosed in JP2849201 the inner gear is disposed inside a rotor in a radial direction. An outer diameter of the inner gear is restricted by an inner diameter of the rotor. With this restriction, to increase the gear diameter (inner diameter) of the inner gear results in reduction in a thickness of the inner gear (between the inner and outer diameters) with a difficulty in providing a sufficient strength to the inner gear.

In the technology disclosed by JP2005-81871A, because the planet gear reducer is disposed in line with the motor in the axial direction, a width in the axial direction of the wheel becomes large with the motor protruding from the wheel. If such the structure with protrusion of the motor from the wheel is used as a steering wheel, a steering angle may be restricted due to an interference between the motor and a mechanism for steering. Further the protrusion from the wheel may affect a space in the vehicle which may cancel a largest advantageous effect of the in-wheel vehicle.

The wheel rotating apparatus according to the present invention has been developed in consideration of the circumstances mentioned above and has a high reduction ratio with a planet gear mechanism with secured rotational support with a compact size in an axial direction of the wheel.

Thus, the wheel rotating apparatus according to the present invention provides a high reduction ration with a compact size in the axial direction of the wheel with stable rotatable support.

Figure 1:
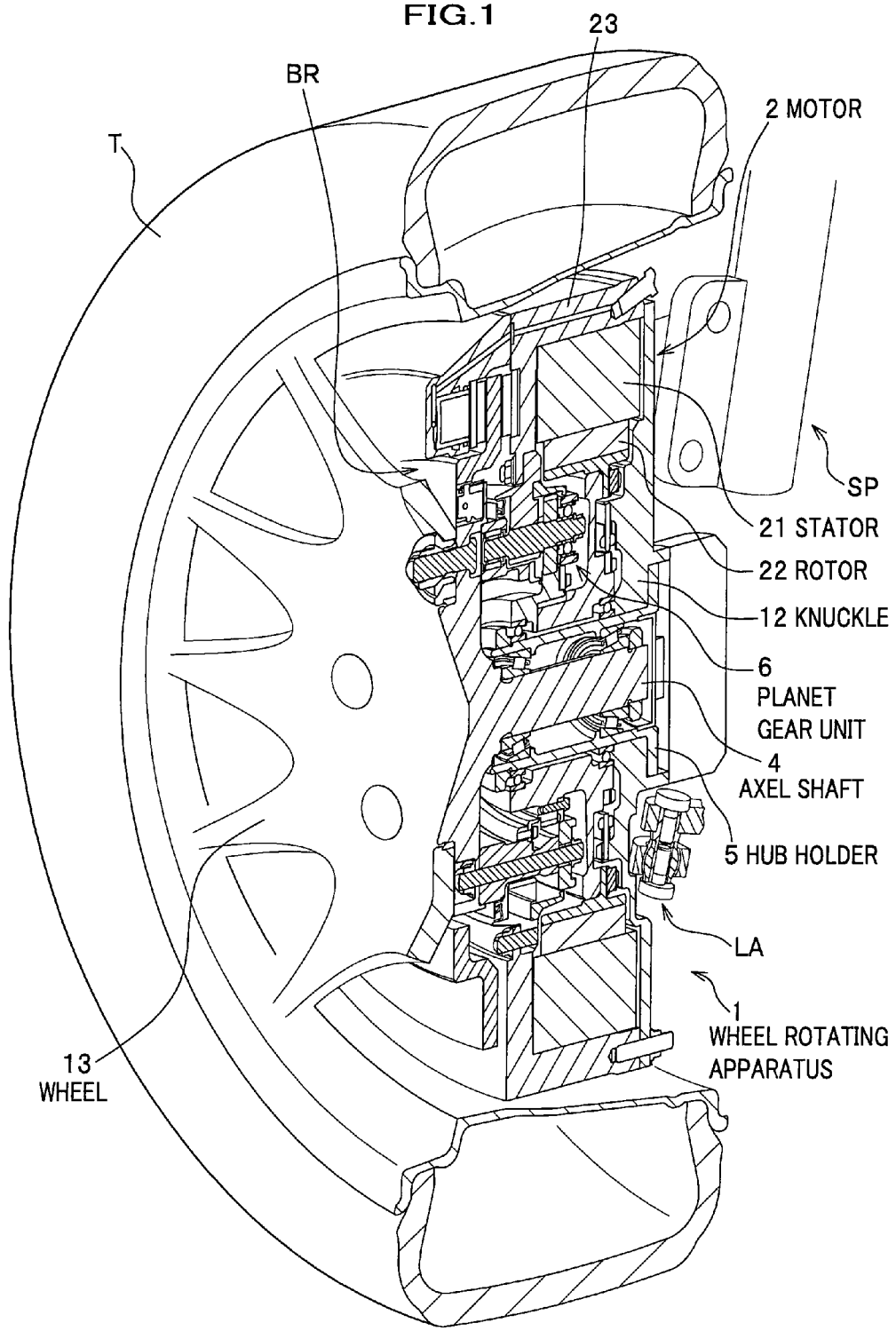
FIG. 1 is a perspective view of a wheel rotating apparatus according to an embodiment of the present invention.
Figure 2:
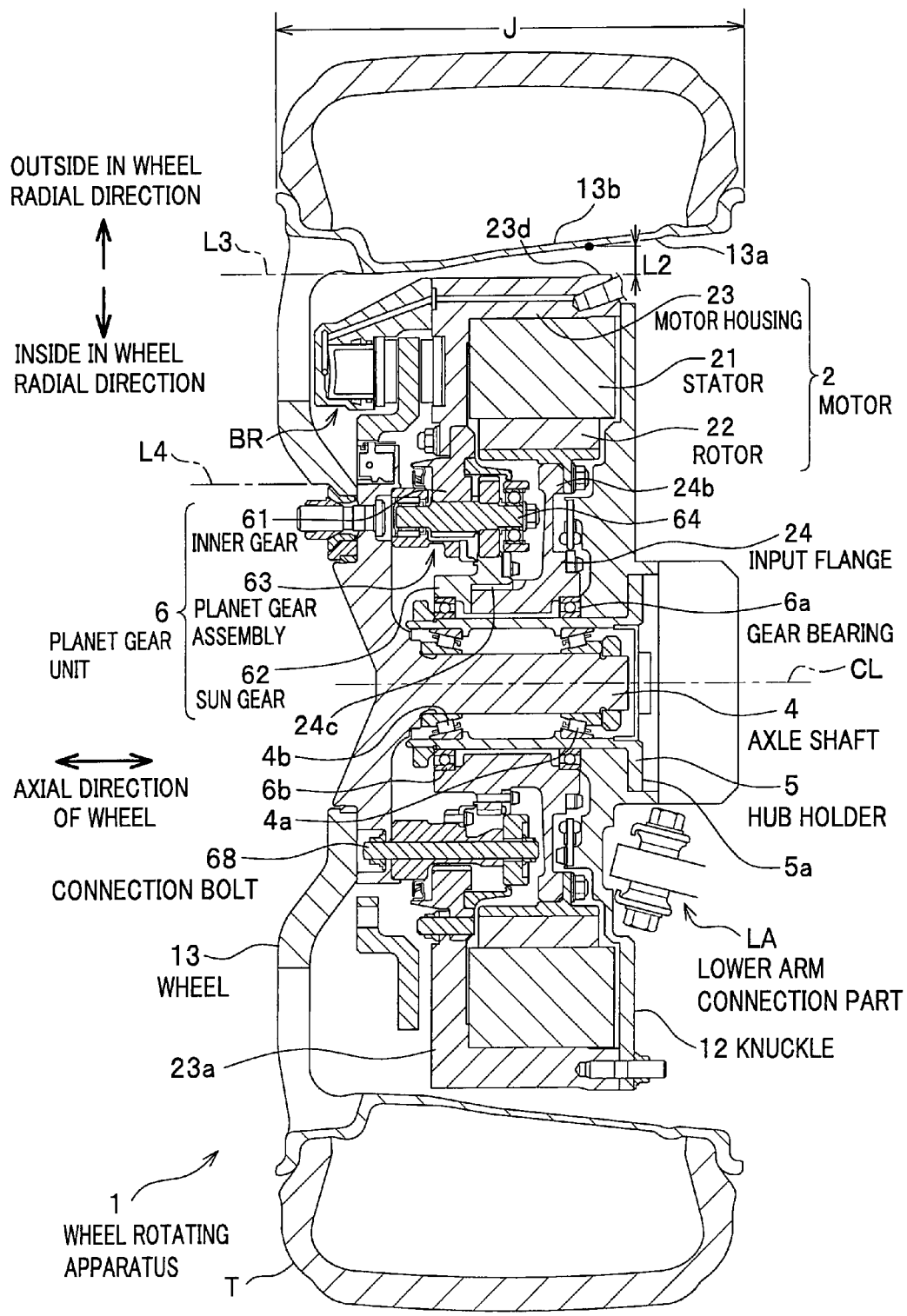
FIG. 2 is a cross-sectional view of a main part shown in FIG. 1.

With reference to drawings will be described an embodiment. FIG. 1 is a perspective view of the wheel rotating apparatus according to the embodiment, and FIG. 2 is a sectional view of a main part shown in FIG. 1. In FIG. 2, a suspension unit SP shown in FIG. 1 is omitted.

The wheel rotating apparatus 1 of the embodiment of the present invention includes, as shown in FIG. 1, a motor 2 for generating a rotation force, a planet gear unit 6 coupled to an output shaft of the motor 2, an axle shaft 4, connected to an output member of the planet gear unit 6, serving as a rotating member of the wheel, a hub holder 5 for rotatably supporting the axle shaft 4 from a body of a vehicle (vehicle body), a knuckle 12 for fixing the hub holder 5 to the vehicle body through a suspension system, all being housed in an inner space of the wheel 13.

More specifically, as shown in FIG. 2, the motor 2 includes a stator 21 and a rotor 22. The stator 21 is fixed to the motor housing 23 and disposed along an inner circumferential face 13a of a rim 13b, inside the wheel 13 in the radial direction of the wheel 13. The rotor 22 is disposed inside the stator 21.

The planet gear unit 6 is disposed substantially inside the motor 2. The axle shaft 4 is fitted into the hub holder 5, fixed to the vehicle body, to be rotatably supported with a hub inner bearing 4a and a hub outer bearing 4b.

The wheel 13 has a brake mechanism BR in the wheel 13 and is disposed outside the wheel in the axial direction of the wheel 13. Disposed inside the brake mechanism BR in the axial direction of the wheel (on the side of the vehicle body) is the wheel rotating apparatus 1. The brake mechanism BR is omitted here.

The embodiment is applicable to all wheels in the in-wheel motor vehicle including the front and rear wheels. However, a steering wheel is exemplified in the embodiment. Even wheels, only driven but not steered, have the same basic structure including the motor 2, the planet gear unit 6, the axle shaft 4, and the hub holder 5.

The motor 2 is a synchronous motor having a stator 21 supplied with an AC current to rotate the rotor 22. A rotation force of the motor 2 is transmitted to the axle shaft 4, while a rotation speed of the motor output shaft is reduced by the planet gear unit 6, to rotate the wheel 13 connected to the axle shaft 4 to generate a drive force.

In the embodiment, the synchronous motor is used. However, the present invention is not limited to this, but the motor may be an induction motor or a dc motor.

Figure 3:
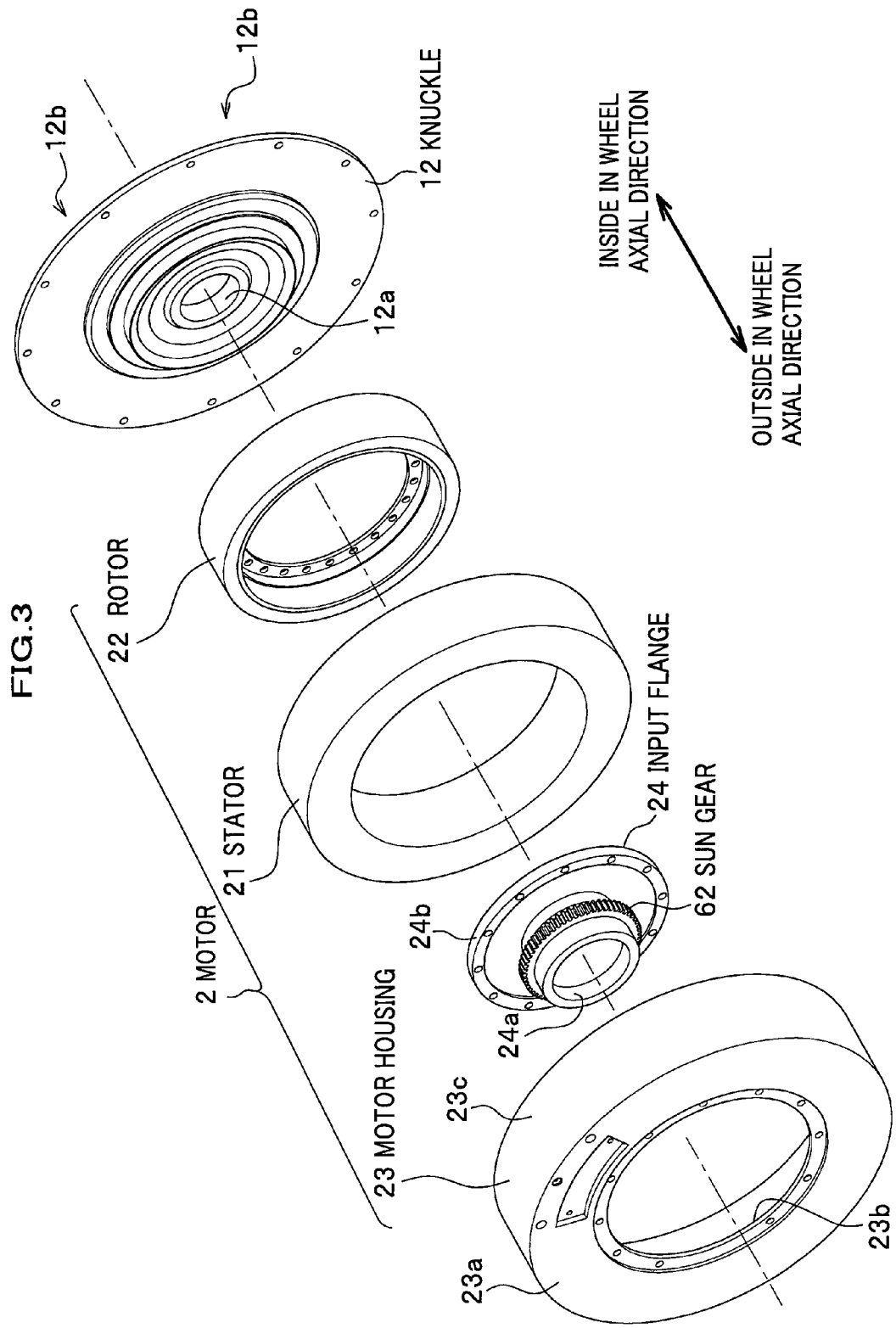
FIG. 3 is an exploded perspective view of a main part of a motor according to the embodiment.

With reference to FIG. 3 will be described a structure of the motor 2 more specifically. FIG. 3 is a exploded perspective view of a main structure of the motor according to the embodiment.

The motor 2 includes, as shown in FIG. 3, a motor housing 23 as a case, the stator 21 having a ring shape fixed along an inner circumferential face of the motor housing 23, the rotor 2, disposed inside the stator 21, for rotation.

Inside the motor housing 23 in the axial direction of the wheel 13, the motor 2 is fixed to the knuckle 12 which is on a side of the vehicle body (see FIG. 2).

The motor housing 23 has a sleeve shape with a flat bottom having a through hole 23b at a center of the bottom 23a. The motor housing 23 is disposed to allow an outer circumferential face 23c of the sleeve shape to face an inner circumferential face 13a of the rim 13b (see FIG. 2). Fixed to the motor housing 23 on an inner circumferential face of the motor housing 23 is the stator 21.

On the other hand, the rotor 22 is formed to have a sleeve shape with iron laminated steel yokes, permanent magnets, or the like and connected to a sun gear 62 through an input flange 24 (see FIG. 2). The sun gear 62 is coupled to the input flange 24 by spline coupling at a fitting part 24c (see FIG. 2) and fitted over the hub holder 5 to be rotatably supported by the hub holder 5 with a gear bearing 6a.

In the structure, the rotor 22 is coupled to the sun gear 62 by the spline coupling at the input flange (motor output shaft) 24, which transmits the rotation force of the rotor 22 to the sun gear 62 without slip, in which a stress in the axial direction can be released.

The input flange 24 has a sleeve shape having a through hole 24 as a hollow part along an inner circumferential face thereof and a flange 24b having a larger diameter at an end thereof in the axial direction of the wheel than the sleeve shape. Formed at an end of the input flange 24 in the axial direction of the wheel (on the side of the wheel, i.e., left in FIG. 4) is a spline for coupling to the sun gear 62 at the fitting part 24c (see FIG. 2).

With this structure, the rotor 22 rotates integrally with the sun gear 62 through the input flange 24. The input flange 24 is coupled to the sun gear 62 by the spline coupling to transmit the rotation force of the rotor 22 to the sun gear 62 with relieving a stress in the axial direction without slip.

In this structure, the torque arm of the motor 2 (a distance from the wheel rotating axis CL which is a rotation center of the rotating rotor 22 to the outer circumference of the rotor 22) is increased for an increased output torque of the apparatus. The present invention enables to use the motor 2 which is thick and large in a diameter and thus is housed within an axial direction width J (see FIG. 2) of the wheel 13 between edges of rims 13b. Further, this structure provides, as shown in FIG. 2, sufficient housing spaces for the brake mechanism BR and a lower arm connection part LA (see FIG. 1). Between the edges of the rims 13b a tire T is fit.

Figure 4:
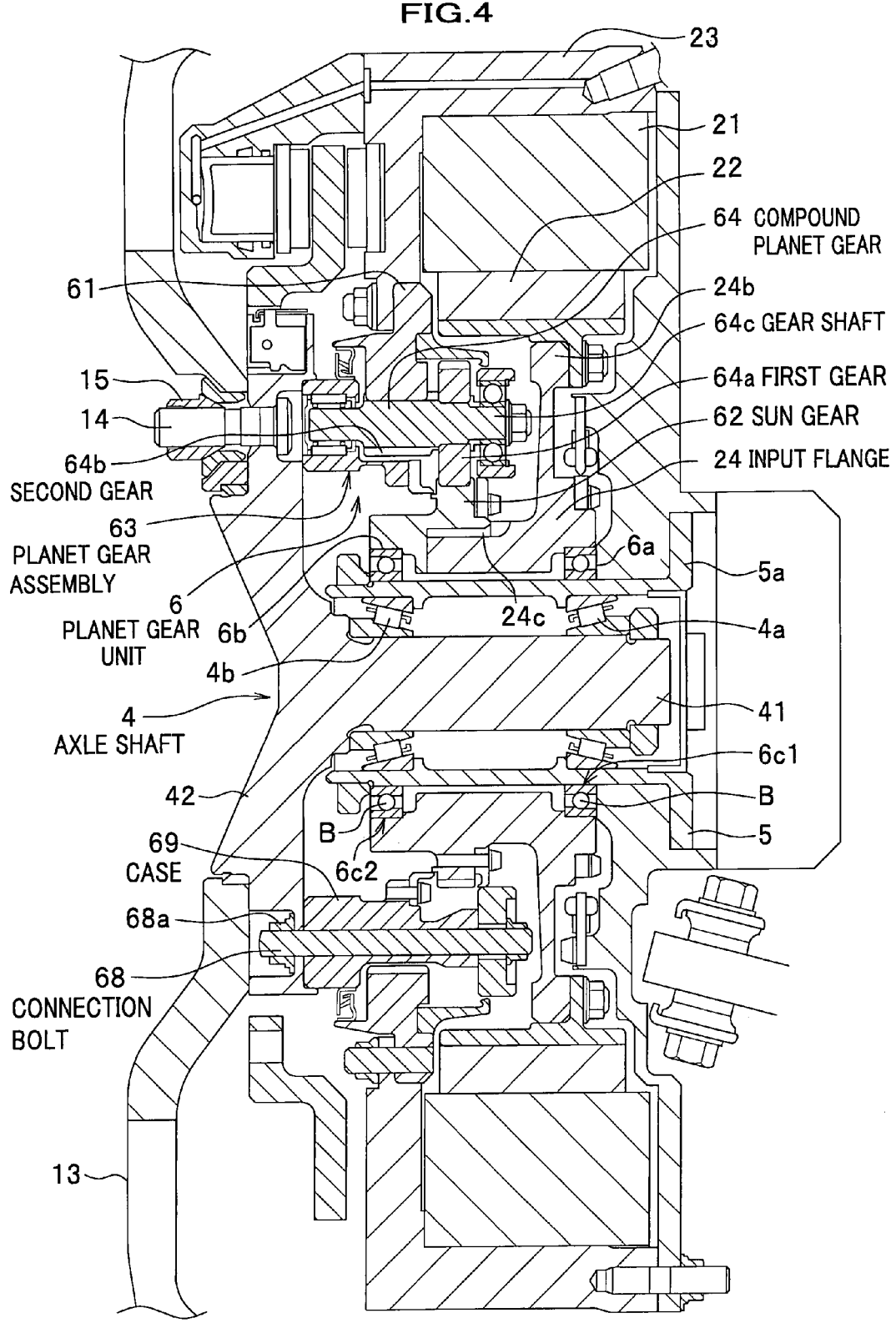
FIG. 4 is a partial cross-sectional view of the wheel rotating apparatus around a planet gear unit shown in FIG. 2.
Figure 5:
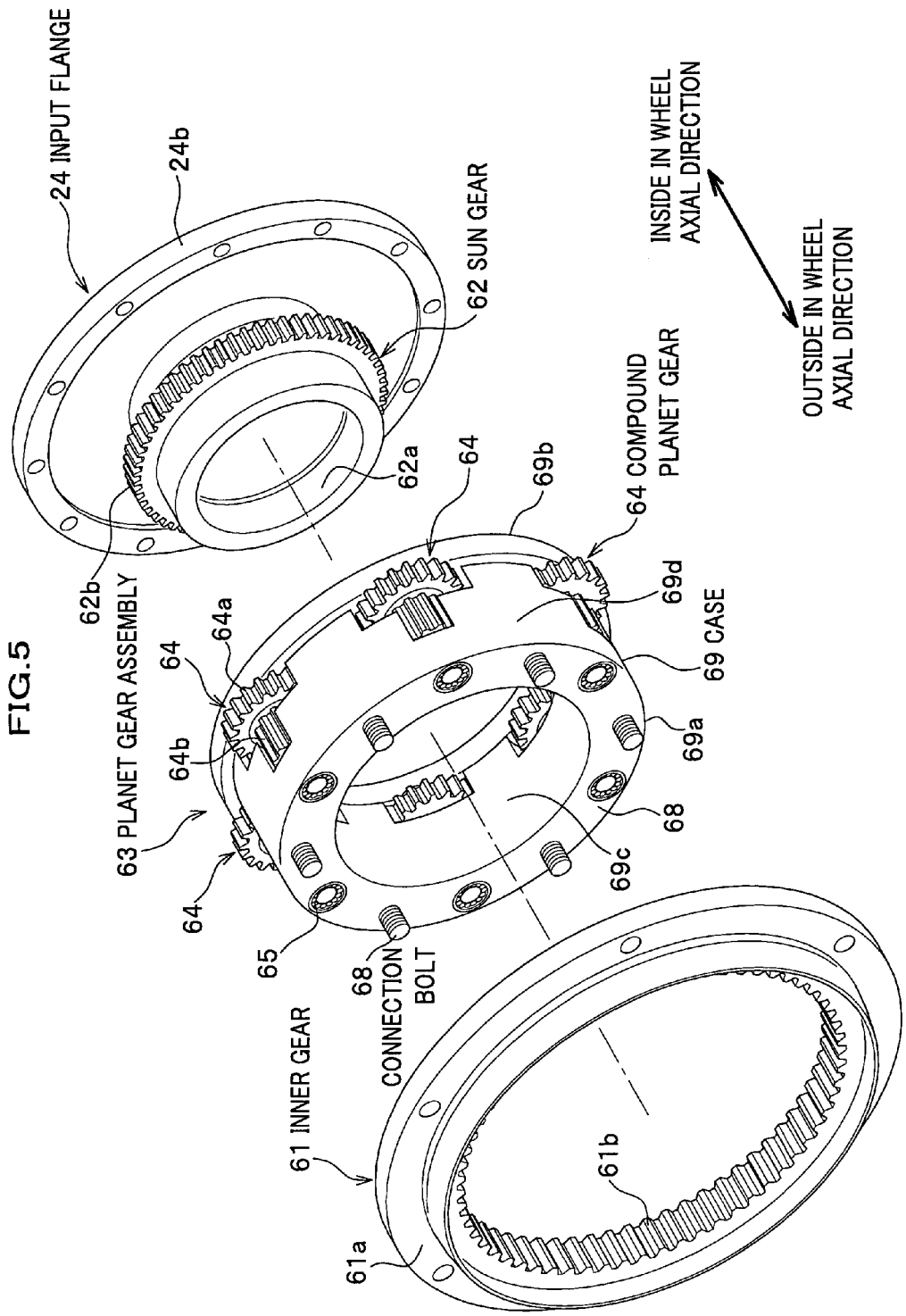
FIG. 5 is an exploded perspective view of the planet gear unit according to the embodiment.
Figure 6:
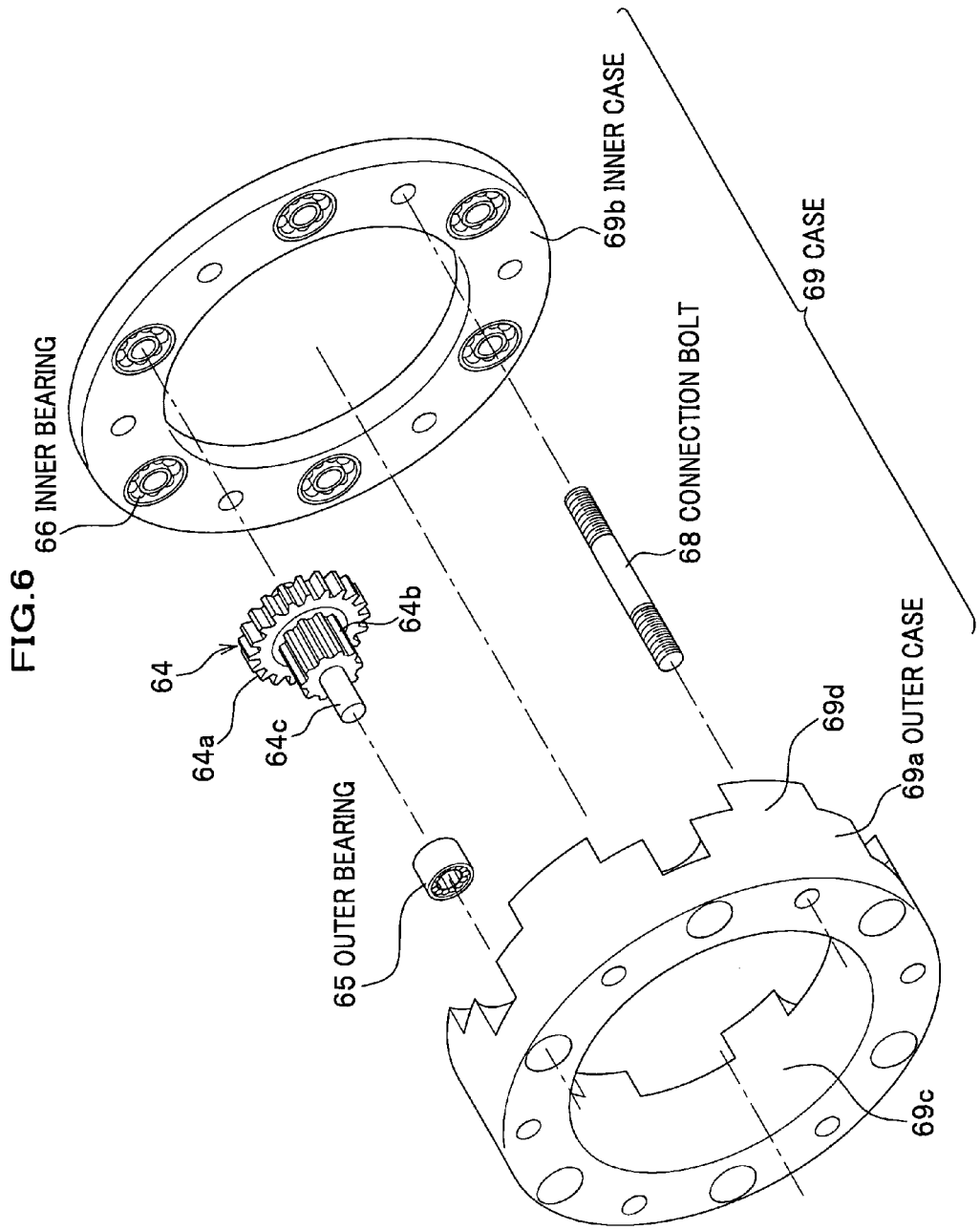
FIG. 6 is an exploded perspective view of a main part of a planet gear assembly according to the embodiment.
Figure 7:
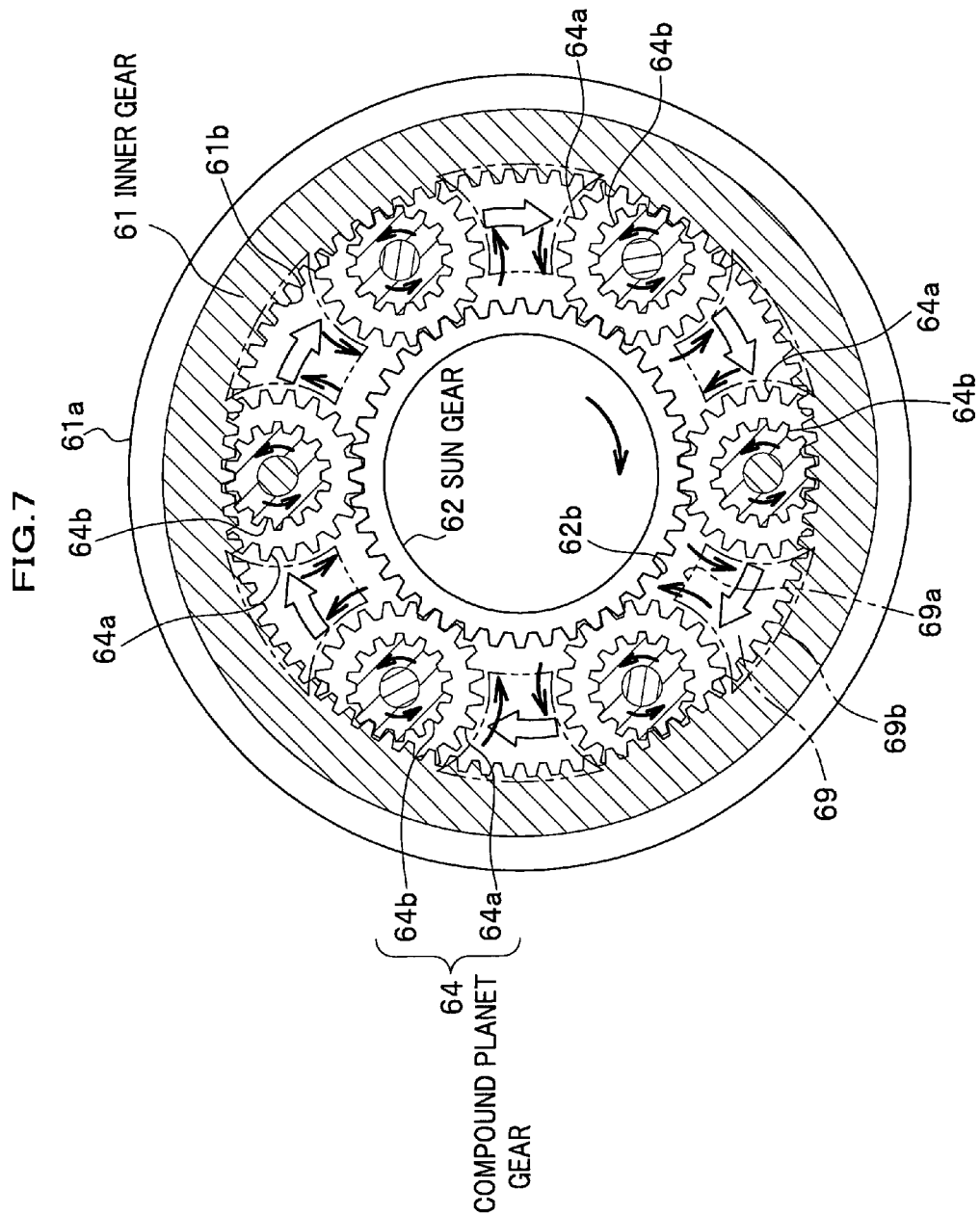
FIG. 7 is an illustration for explaining an operation of the planet gears according to the embodiment.

With reference to FIGS. 4 to 6, will be described the planet gear unit 6. FIG. 4 is a partial cross-sectional view for illustrating the planet gear unit shown in FIG. 2. FIG. 5 is an exploded perspective view of the planet gear unit according to the embodiment of the present invention. FIG. 6 is an exploded perspective view of main parts of the planet gear assembly. FIG. 7 is a plan view for illustrating an operation of the planet gear unit.

The planet gear unit 6 includes, as shown in FIG. 4, an inner gear 61 fixed to the bottom 23a (see FIG. 3) of the motor housing 23, the sun gear 62 fixed to the rotor 22 (see FIG. 3) through the input flange 24, and a planet gear assembly 63, geared with the sun gear 62 and the inner gear 61, for transmitting a rotating force of the sun gear 62 to the axle shaft 4 (see FIG. 2), all being housed in the wheel within the axial direction width J of the wheel (see FIG. 2).

As shown in FIG. 5, the planet gear assembly 63 includes six compound planet gears 64 as planet gears rotating around the outer teeth 62b of the sun gear 62, the outer bearings 65 and the inner bearings 66 (see FIG. 6) for rotatably supporting the compound planet gears 64, connection bolts 68 for connection to the axle shaft 4 (see FIG. 4), and a case 69 as a gear case for housing these components. The case 69 includes an outer case 69a and an inner case 69b.

The planet gear assembly 63 has a substantially ring shape and functions as an output member of the planet gear unit 6 rotating about the wheel rotating axis (a rotating axis of the axle shaft 4) CL (see FIG. 2) by revolution of the compound planet gears 64.

The compound planet gears 64 each include a first gear 64a as an input stage, a second gear 64b as an output stage, and a gear shaft 64c as a rotation axis (see FIG. 6). The compound planet gears 64 are attached to the case 69 such that a tooth face of the first gear 64a protrudes from the inner circumferential face 69c (and the outer circumferential face 69d) of the case 69, and a tooth face of the second gear 64b protrudes from the outer circumferential face 69d. Thus, in the compound planet gear 64, the first gear 64a is geared with the outer tooth 62b of the sun gear 62 on a side of the inner circumferential face 69c of the case 69, and the second gear 64b is geared with an inner gear 61b of the inner gear 61 on a side of an outer circumferential face 69d.

Further, the compound planet gear 64 has the first gear 64a as the input stage with a larger gear diameter (the number of the tooth) than the second gear 64b as the output stage.

Then the rotation speed of the compound gears 64 is determined in accordance with the ratio between the sun gear 62 and the first gear 64a in teeth diameter (the number of tooth), and the revolution speed of the compound planet gears 64 (rotation speed of the wheel) is determined in accordance with a ratio between the second gear 64b and the inner gear 61. Thus, the structure in which the first gear 64a of the input stage is made large than the second gear 64b of the output stage, can increase a reduction ratio than that in a case in which a single planet gear would be used.

As mentioned above, the reduction ratio can be controlled by adjusting the ratio between the first gear 64a and the second gear 64b. Thus, the reduction ratio can be more freely determined.

In the embodiment, the first gear 64a of the input stage has a gear diameter (the number of tooth) larger than the second gear 64b of the output stage. The present invention is not limited to this, but may have a gear diameter smaller than the second gear 64b.

As mentioned above, the ratio in the gear diameter between the first gear 64a and the second gear 64b can be appropriately determined to adjust the reduction ratio in accordance with a performance of the in-motor vehicle and a performance of the motor.

In the compound planet gears 64, the gear shaft 64c is rotatably supported by the outer bearing 65 and the inner bearing 66. For example, a needle bearing allowable a movement in a thrust direction of the gear shaft is used as the outer bearing 65, and a ball bearing capable of restricting the movement in the thrust direction is used as the inner bearing 66.

In the embodiment, the needle bearing is used as the outer bearing 65, and the ball bearing is used as the inner bearing 66. However, the present invention is not limited to this. A ball bearing may be used as the outer bearing 65 and a needle bearing may be used as the inner baring 66.

In addition to the ball bearing, various types of bearings capable of withstanding a radial load and a thrust load such as a tapered roller bearing can be used as the bearing capable of restricting the movement of the gear shaft 64c in the thrust direction.

As shown in FIG. 5, the inner gear 61 has a substantially ring shape including a flange 61a inside thereof in the wheel axis direction and an inner circumferential face on which inner tooth 61b engageable to the second gear 64b of the compound planet gear 64 are formed. The flange 61a is fixed to the bottom 23a of the motor housing 23 (see FIG. 2).

The sun gear 62 has a substantially sleeve shape having a through hole 62a as a hollow part on an inner circumferential face and outer tooth 62b engageable to the first gear 64a (the gear at the input stage) of the compound planet gear 64 on an outer circumferential face thereof. The flange 24b of the input flange 24 spline-coupled to the sun gear 62 is fixed to the rotor 22. This allows the sun gear 62 to rotate about the wheel rotating axis CL integrally with the rotor 22 (see FIG. 2).

Will be described a positional relation of the planet gear unit 6 in the wheel rotating apparatus 1 according to the embodiment of the present invention.

The inner gear 61 is disposed, as shown in FIG. 4, outside the rotor 22 in the wheel axis direction without intrusion on inside space of the rotor 22. The inner gear 61b of the inner gear 61 is geared with the second gear 64b of the compound planet gear 64 inside thereof in the radial direction of the wheel, and the first gear 64a of the compound planet gear 64 is disposed inside the second gear 64b in the wheel axis direction (on the side of the vehicle body).

With this structure, the first gear 64a, having a larger diameter than the second gear 64b, is housed in the inside space of the rotor 22. This structure allows the compound planet gear 64 having a larger axial length than that in a case where a planet gear having only single stage would be used.

Further, the sun gear 62 geared with the first gear 64a is formed to extend to a space inside the second gear 64b in the wheel radial direction (on the side of the vehicle).

Generally, in consideration of the wheel balance, it is avoided to dispose the inner gear 61 having a considerable weight at outside (in the wheel axis direction) part of the wheel as described in the embodiment. However, the wheel balance is improved by forming the sun gear 62, the input flange 24, and the hub holder 5 in sleeve shapes with hollow parts for inversion and increasing supporting spans in the axial direction of the gear bearings 6a and 6b and the hub bearings 4a and 4b as shown in FIG. 4.

With the structure of the planet gear unit 6, the planet gear assembly 63 housing the six compound planet gears 64 rotates about the wheel rotating axis CL with revolution of the compound planet gears 64 to function as an output axis of the planet gear unit 6.

More specifically, as shown in FIG. 7, when the sun gear 62 rotates clockwise (in FIG. 7) with rotation of the rotor 22 in a status in which the inner gear 61 is fixed to the motor housing 23 (see FIG. 2), the first gears 64a geared with the sun gear 62 rotate counterclockwise. This rotates the second gears 64b because the first gears 64a are connected to the gear shafts 64c integrally with the second gears 64b. When the second gears 64b rotate, the compound planet gears 64 revolute clockwise around the outer tooth 62b of the sun gear 62 with counterclockwise rotation about their axes, because the inner gear 61, geared with the second gears 64b, is fixed.

When the compound planet gears 64 revolve around the outer tooth 62b of the sun gear 62, the planet gear assembly 63 integrally rotates about the wheel rotating axis CL (see FIG. 2) because the six compound planet gears 64 are housed by the case 69 (see FIG. 4) as a gear case, functioning as an output shaft of the planet gear unit 6.

With reference to FIG. 2, will be described a structure on the side of the vehicle body.

On the side of the vehicle body, as shown in FIG. 2, the hub holder 5 is connected to the knuckle 12 suspended by a suspension system such as the suspension unit SP (see FIG. 1). The axle shaft 4 is fitted into an inner circumferential face of the hub holder 5 which rotatably supports the axle shaft 4 with a hub inner bearing 4a and a hub outer bearing 4b. The sun gear 62 and the input flange 24 are fitted over an outer circumferential face of the hub holder 5 which rotatably supports the sun gear 62 and the input flange 24 by the hub holder 5 with the gear bearings 6a and 6b.

The axle shaft 4, the hub inner bearing 4a, the hub outer bearing 4b, the hub holder 5, and the knuckle 12 form a so-called driving shaft system.

The knuckle 12 is formed in a disk (see FIG. 3) having, at a center thereof, a through hole 12a that the hub holder 5 is fitted into and fixed to. The knuckle 12, at a connection part 12b, is connected to the suspension unit SP (see FIG. 1) and to a tie rod (not shown) as a steering member.

In the embodiment, a so-called MacPherson Strut suspension is exemplified. However, the present invention is not limited to this. Other types of suspensions such as a Double Wishbone suspension are applicable to the present invention.

More specifically, various types of suspensions are used depending on the vehicle. Since the driving shaft system including the knuckle 12 and the hub holder 5 shown in FIG. 2 is used in the present invention, the present invention is applicable to various types of suspensions by only replacing the knuckle 12, with the motor 2 unchanged irrespective of whether the wheel is a steering wheel or the driving wheel.

A king-pin angle or a scrub can be optimally set in accordance with various vehicle requirements by adaptively changing the shape or position of the connecting part 12b.

As shown in FIG. 2, the hub holder 5 has a sleeve shape with a flange 5a at an end face on an inner side in the wheel axis (on the side of the vehicle body). The hub holder 5 is fitted into the through hole 12a at the center of the knuckle 12 and is fixed with bolts (not shown) in which the flange 5a is in contact with an end face, on the vehicle body side, of the knuckle 12 (see FIG. 3).

As shown in FIG. 4, the axle shaft 4 includes a shaft part 41 serving as a rotation axis of the wheel 13, a disk part 42 formed on an end part of the shaft part 41 on the outer side in the wheel axis direction. The axle shaft 4 is connected to the wheel 13 with the hub bolts 14 and the nuts 15 outside (in the wheel axis direction) the disk part 42.

Further, the axle shaft 4 is connected to the planet gear assembly 63 serving as an output shaft of the planet gear unit 6 with connection bolts 68 and nuts 68a inside (wheel axis direction) the disk part 42 (on the vehicle body side).

The gear bearings 6a and 6b each include an inner ring 6c1 having a race for holding rolling elements B (balls) and an outer wheel 6c2 having a race for retaining rolling members (balls). The inner ring 6c1 and the outer ring 6c2 have diameters identical with gear bearings 6a and 6b.

As mentioned above, using bearings having the same diameters for rotatably support the sun gear 62 and the input flange 24 improves assembling processes and decreases man-hours of assembling to reduce the cost.

With reference to FIG. 4, will be described briefly a relationship between the axle shaft 4 and the planet gear unit 6.

As described earlier, the rotating force of the rotor 22 (see FIG. 2) is transmitted to the planet gear assembly 63c functioning as an output shaft of the planet gear unit 6 at a predetermined reduction ratio. On the other hand, the axle shaft 4 is rotatably supported by the hub holder 5 (see FIG. 2) with the hub inner bearing 4a and the hub outer bearing 4b.

Thus, the axle shaft 4 is fixed to the planet gear assembly 63c with the connection bolts. Then, the rotation force of the rotor 22 is transmitted to the axle shaft 4 with a rotation speed of the rotor 22 reduced by the planet gear unit 6 and further to the wheel 13 through the axle shaft 4 (see FIG. 2).

Figure 8:
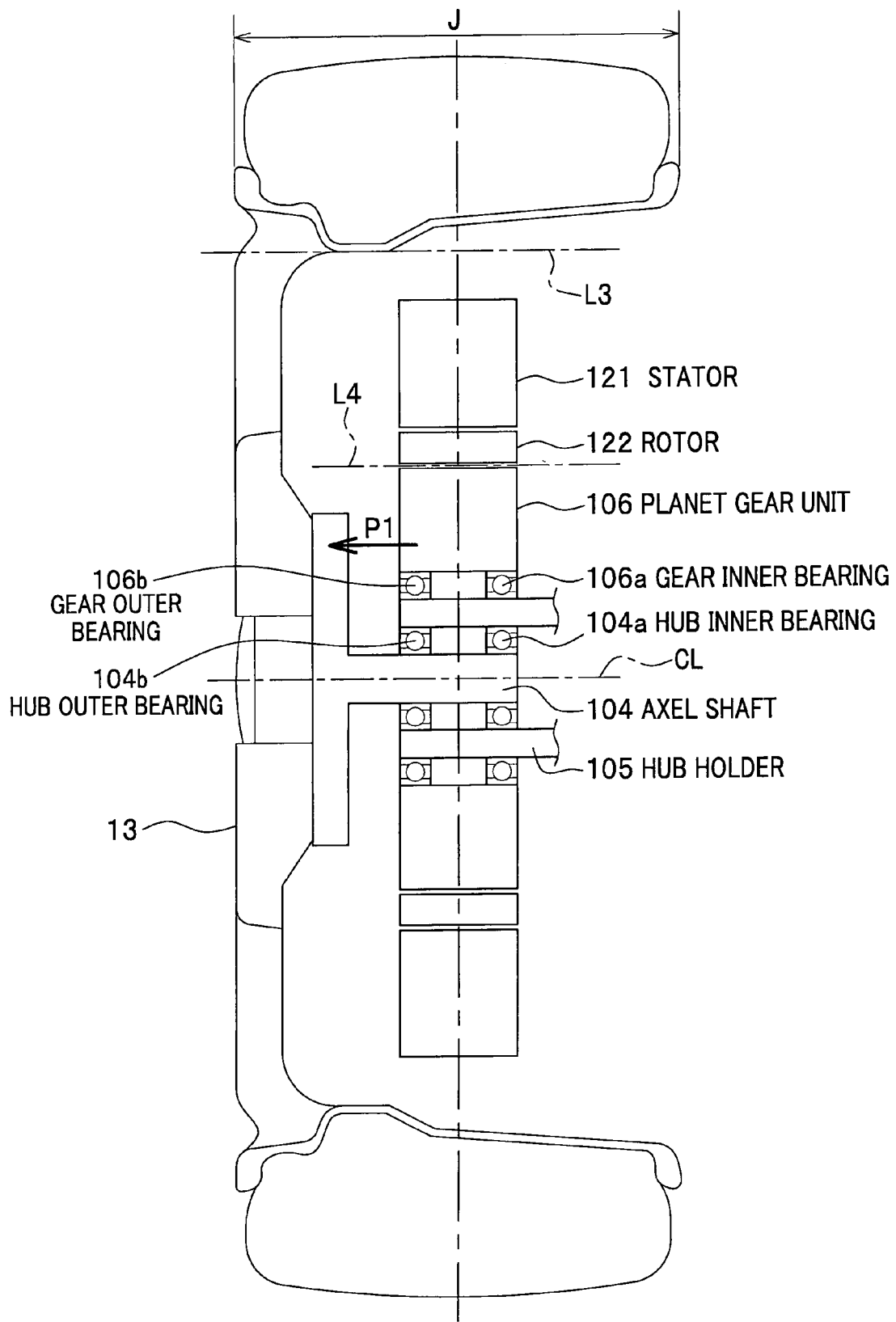
FIG. 8 is a schematic cross-sectional view of an inner wheel rotating type of wheel rotating apparatus.
Figure 9:
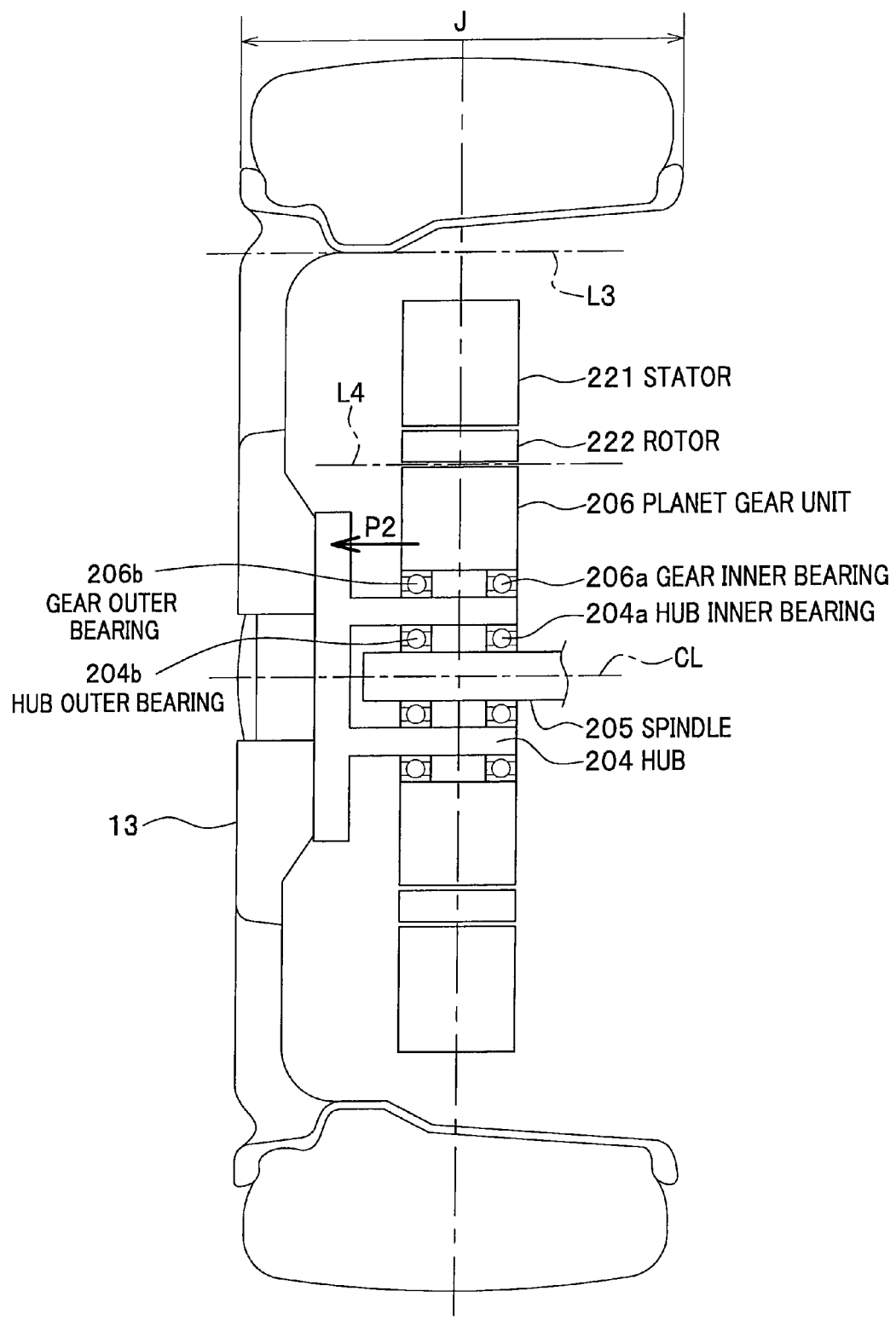
FIG. 9 is a schematic cross-sectional view of an outer wheel rotating type of wheel rotating apparatus.

With reference to FIGS. 8 and 9 will be described a relationship between the wheel rotating member according to the present invention and a rotatably supporting member for rotatably support the wheel rotating member from the vehicle body side. FIG. 8 is a cross-sectional view of schematically showing a so-called inner shaft rotation type. FIG. 9 is a cross-sectional view of schematically showing a so-called outer shaft rotation type.

FIGS. 8 and 9 are provided for schematically illustrating the rotatably supporting types of wheel rotating apparatus according to the embodiment of the present invention, but are not identical with the actual arrangement.

The drive axis system of the inner shaft type according to the present invention is, as shown in FIG. 8, provided for rotating the wheel 13 in which the axel shaft 104 serving as the wheel rotating member is fitted into the hub holder 105 to be rotatably supported with the hub inner bearing 104a and the hub outer bearing 104b, the hub holder 105 being fixed to the vehicle body side.

Further, the planet gear unit 106 is rotatably supported by the hub holder 105 with a gear inner bearing 106a and a gear outer bearing 106b.

In a case where a heavy part is disposed on an outside (in the wheel axis direction) part of the wheel, an inner (in the wheel axis direction) part (joint between the knuckle and the wheel rotatably support) tends to receive a heavy load. Thus, the inner shaft rotating type capable of making the diameter of the rotatably supporting member larger is preferable.

In the outer shaft rotating type of drive shaft system, as shown in FIG. 9, a hub 204 as a wheel rotating member is fitted over to a spindle 205 be rotatably supported with a hub inner bearing 204a and a hub outer bearing 204b, the spindle 205 serving as a rotatable supporting member fixed to the vehicle body side.

Thus, in the inner shaft rotating type, a drive force is transmitted from the planet gear unit 106 to the wheel 13 through the axel shaft 104 (an arrow P1, see FIG. 8). On the other hand, in the outer shaft rotating type, the drive force is transmitted from the planet gear unit 206 to the wheel 13 through the hub 204 (An arrow P2, see FIG. 9). A stator 221 and a rotor 222 are disposed outside a middle (half) line L4 (in FIG. 9) of the rotation center line CL of the wheel 13 and a bead breaking line (inner diameter) L3.

Further, the planet gear unit 206 is rotatably supported by the hub 204 with a gear inner bearing 206a and a gear outer bearing 206b. The hub 204 is fitted over a spindle 205 to be rotatably supported with the hub inner bearing 204a and the hub outer bearing 204b, the spindle 205 being fixed to the vehicle body side. Here, the hub holder 105 and the axel shaft 104 substantially correspond to the spindle 205 and the hub 204 of the outer shaft rotating type.

Therefore, the present invention is similarly applicable to the outer shaft rotating type in addition to the inner shaft rotating type.

In the embodiment, as an arrangement of the motor, a so-called inner rotor type is used. The stator 121 and the rotor 122 are disposed outside a middle line L4 (in FIGS. 8 and 9) of the rotation center line CL of the wheel 13 and a bead breaking line L3.

Thus, the stator 121 and the rotor 122 disposed outside the middle line L4 of the rotation center line CL of the wheel 13, which makes a torque arm as large as possible within a limit in a wheel diameter by disposing the stator 121 close to the outside of the wheel 13. However, depending on the wheels or vehicles to which the present invention is applied, only the stator 121 may be disposed outside the middle line L4.

With reference to FIG. 2, will be described an operation of the wheel rotating apparatus 1 according to the embodiment.

In the wheel rotating apparatus according to the embodiment of the present invention, when the stator 21 is supplied with an AC current, the rotor 22 rotates, a rotation force of the rotor 22 is transmitted to the axle shaft 4 with the rotation speed reduced to rotate the wheel connected to the axle shaft 4, generating a drive force.

More specifically, rotation of the rotor 22 rotates the sun gear 62 connected to the rotor through the input flange 24. Because the inner gear 61 is fixed to the motor housing 23, the six compound planet gear 64 including the first gear 64a for the input stage and a second gear 64b for an output stage rotate with revolution around the sun gear 62 (see FIG. 5). Because the six compound planet gear 64 are housed integrally with the planet gear assembly 63 (see FIG. 4), with revolution of the six completed planet gears, the planet gear assembly 63 serves as a rotation axis of the planet gear unit rotating about the wheel rotating axel CL.

On the other hand, the hub holder 5 is connected to the vehicle body side through the knuckle 12. The axle shaft 4 is fitted into the hub holder 5 to be rotatably supported by the hub holder 5 with the hub inner bearing 4a and the outer hub bearing 4b. Because the planet gear assembly 63 is connected to the axle shaft 4 with connection bolts, the axle shaft 4 is rotated about the wheel rotation axis CL, rotating the wheel 13 to generate the driving force.

As mentioned above, the rotation force is transmitted to the axle shaft 4 with a rotational speed of the motor 2 reduced with the planet gear unit 6, which increases an output efficiency with miniaturization of the motor 2 to improve running performances such as acceleration.

Further, in the planet gear unit 6, the compound planet gear 64 is provided by combining the first gear 64a and the second gear 64b. Thus, a desired reduction ratio can be determined by setting the gear diameter (the number of the tooth) between the first gear 64a and the second gear 64b.

This prevents the motor 2 from being increased in size by decreasing the load on the motor 2 and being decreased in dimension in the wheel axis direction. In addition, the first gear 64a is disposed in an inside space of the inner circumferential face of the rotor 22. Thus, the planet gear unit 6 is compactly housed in the wheel axis direction.

More specifically, the stator 21 is disposed inside the wheel 13 in the radial direction along the inner circumferential face 13a of the wheel 13 and the rotor 22 is disposed inside the stator 21, which increases the torque arm of the motor 2, decreasing a width of the motor in the axial direction.

Further, the first gear of the planet gear unit 6 is disposed in an inside space of the inner circumferential face of the rotor with a result that the planet gear unit 6 is housed within the width J of the wheel 13 in the axial direction. This allows the motor 2 and the planet gear unit 6 to be housed in the wheel 13, which prevents the motor 2 and the planet gear unit 6 from protruding from the wheel 13. This eases application of the present invention to the steering wheel and increases an effective space in the vehicle.

As mentioned above, according to the present invention, in the wheel rotating apparatus, the motor and the planet gear unit are compactly formed and lightened with sufficient dynamic performance.

Figure 10:
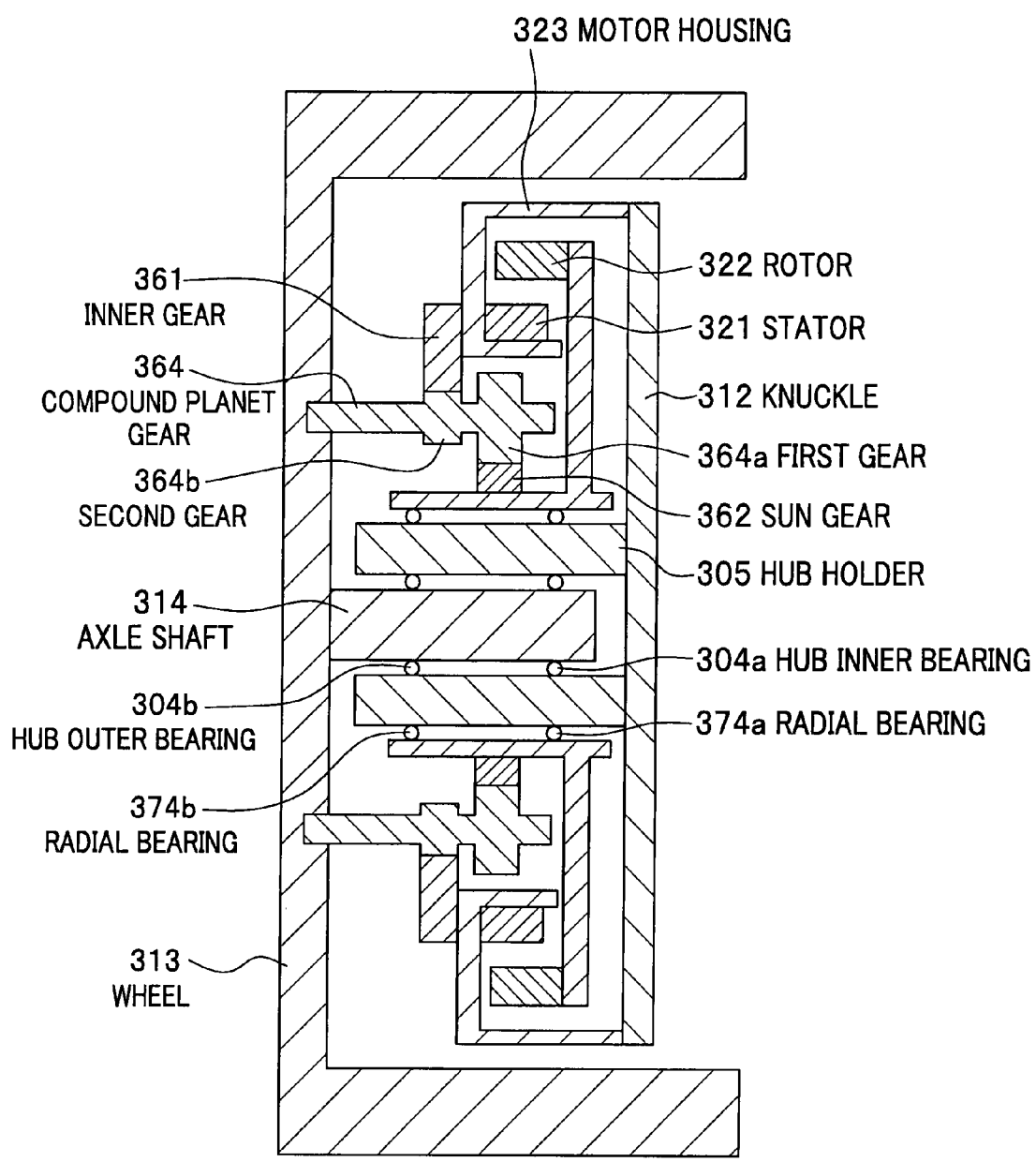
FIG. 10 is a schematic cross-sectional view of an outer wheel rotating type of wheel rotating apparatus according to the embodiment.

With reference to FIG. 10 will be described another embodiment of the wheel rotating apparatus according to the present invention. FIG. 10 is a schematic drawing of the wheel rotating apparatus using a so-called outer rotor type of motor.

Because the structure of the embodiment is substantially the same as that of the above-mentioned embodiment except the arrangement of the motor and the stator and modification accompanied by the change in the arrangement of the motor and the stator, and thus a duplicated description is omitted.

As shown in FIG. 10, in the outer rotor type of motor, a stator 321 is fixed to a motor housing 323, and a rotor 322 is disposed outside the stator 321 in the radial direction of the wheel 313.

A knuckle 312 is connected to the motor housing 323 to which an internal gear 361 is fixed. The rotor 322 is coupled to the sun gear 362 which is geared with a first gear 364a of a compound planet gear 364. A second gear 364b of the compound planet gear 364 integral with the first gear 364a is geared with the inner gear 361. The compound planet gears 364 are coupled to the wheel 313 connected to an axle shaft 314 which is fitted with a hub inner bearing 304a and a hub outer bearing 304b into a hub holder 305 connected to the knuckle 312. The sun gear 362 is rotatably supported by the radial bearings 374a and 374b.

As mentioned above, the embodiments of the present invention are described. However, the present invention is not limited to them, but may be modified.

In the embodiments, the inner gear 61 of the planet gear unit 6 is fixed to the motor housing 23, and the rotor 22 is fixed to the sun gear 62 to generate the output from the revolution of the compound planet gears 64. However, the present invention is not limited to this. For example, the compound planet gears 64 may be fixed, and the output is obtained from the inner gear 61.

In the embodiments, a whole of the motor 2 and the planet gear unit 6 is housed within the width J in the axial direction of the wheel 13. However, the present invention is not limited to this. For example, a part such as a part of the motor housing may protrude from the wheel 13.

In the embodiments, the sun gear 62 and the input flange 24 as discrete members are coupled by spline. However, the present invention is not limited to this. For example, the sun gear 62 may be integrated with the input flange 24.

In the embodiment, a gap between the inner circumferential face 13a and an edge 23d of the motor housing 23 is decreased down to 5 to 20 mm for a large diameter of the motor 2 (see FIG. 2).

As mentioned above, according to the embodiments of the present invention there is provided a wheel rotating apparatus for rotating a wheel or a predetermined wheel, having a rim and a predetermined inner space defined by a circumference face of the rim, to generate a driving force, comprising: a base including the knuckle and the motor housing 23 to be supported by a body (vehicle body through a suspension SP); a motor, in the inner space, including: a stator 21 fixed to the base: a rotor 22 facing the stator 21 along the circumferential direction of the wheel 13, the stator 21 and the rotor 23 being housed along the rim 13b inside the rim 13b in a radial direction of the wheel 13; and a motor output shaft (the input flange 24) inside the stator 21 and the rotor 22 in the radial direction for generating a rotation force at the motor output shaft; a planet gear unit 6 in the inner space, disposed inside the rotor and the stator in the radial direction, including: a sun gear 62 coupled to the motor output shaft; a planet gear 64; an inner gear 61 coupled to the sun gear 62 through the planet gear 64; and a planet gear unit output member (an outer case 69a, connection bolts 68, nuts 68a); a wheel rotating member (the disk part 42) connected to the planet gear unit output member; a rotatably supporting member (the hub holder 5) connected to the base for rotatably supporting the wheel rotating member (axle shaft 4) and the sun gear 62 from the base, the wheel 13 being to be connected to the wheel rotating member, wherein the planet gear 64 includes a first gear 64a having a first diameter and a second gear 64b, having a second diameter different from the first diameter, connected to the first gear 64a in an axial direction thereof to have a unit body, the first gear 64a is in an inside space defined by circumferential faces of the stator 21 and the rotor 22 and geared with the sun gear 63, and the second gear 64b is outside the first gear 64a in the axial direction relative to the body and geared with the inner gear 64a. Further, there is provided an in-wheel vehicle including this wheel rotating apparatus.

The invention claimed is:

1. A wheel rotating apparatus for rotating a wheel, having a rim and a predetermined inner space defined by a circumference face of the rim, to generate a driving force, comprising:
   a base to be supported by a body;
   a motor, in the inner space, including: a stator fixed to the base: a rotor facing the stator along the circumferential direction of the wheel, the stator and the rotor being housed along the rim inside the rim in a radial direction of the wheel; and a motor output shaft inside the stator and the rotor in the radial direction for generating a rotation force at the motor output shaft;
   a planet gear unit in the inner space, disposed inside the rotor and the stator in the radial direction, including: a sun gear coupled to the motor output shaft; a planet gear; an inner gear coupled to the sun gear through the planet gear; and a planet gear unit output member;
   a wheel rotating member connected to the planet gear unit output member;
   a rotatably supporting member connected to the base for rotatably supporting the wheel rotating member and the sun gear from the base, the wheel being to be connected to the wheel rotating member, wherein
   the planet gear includes a first gear having a first diameter and a second gear, having a second diameter different from the first diameter, connected to the first gear in an axial direction thereof to have a unit body,
   the first gear is in an inside space defined by circumferential faces of the stator and the rotor and in mesh with the sun gear, and
   the second gear is outside the first gear in the axial direction relative to the body and in mesh with the inner gear.

2. The wheel rotating apparatus as claimed in claim 1, further comprising an input flange for coupling the rotor to the sun gear to rotate the sun gear integrally with the rotor, wherein the inner gear is connected to the base.

3. The wheel rotating apparatus as claimed in claim 2, wherein the sun gear and the input flange have sleeve shapes to have a continuous hollow portion therein, and the wheel rotating member and the rotatably supporting member are disposed in the hollow portion.

4. The wheel rotating apparatus as claimed in claim 3, wherein the rotatably supporting member has a sleeve shape to have a hollow part therein, and the wheel rotating member has a shaft inserted into the hollow part and fitted into the hollow part with a bearing.

5. The wheel rotating apparatus as claimed in claim 4, further comprising:
   an outer gear bearing having a first outer diameter; and
   an inner gear bearing having a second outer diameter identical with the first diameter,
wherein the sun gear and the input flange are fitted over a unit including the rotatably supporting member and the wheel rotating member through the outer gear bearing and the inner gear bearing.

6. The wheel rotating apparatus as claimed in claim 4, wherein the wheel rotating member has a sleeve shape to have a hollow part therein, and the rotatably supporting member has a shaft inserted into the hollow part and fitted into the hollow part with a bearing.

7. The wheel rotating apparatus as claimed in claim 6, further comprising:
   an outer gear bearing having a first outer diameter; and
   an inner gear bearing having a second outer diameter identical with the first diameter,
wherein the sun gear and the input flange are fitted over a unit including the rotatably supporting member and the wheel rotating member through the outer gear bearing and the inner gear bearing.

8. The wheel rotating apparatus as claimed in claim 3, further comprising:
   an outer gear bearing having a first outer diameter; and
   an inner gear bearing having a second outer diameter identical with the first diameter,
wherein the sun gear and the input flange are fitted over a unit including the rotatably supporting member and the wheel rotating member through the outer gear bearing and the inner gear bearing.

9. The wheel rotating apparatus as claimed in claim 2, wherein the sun gear and the input flange are fitted over a unit, including the rotatably supporting member and the wheel rotating member, through an outer bearing having a first outer diameter and an inner bearing having a second outer diameter identical with the first diameter.

10. The wheel rotating apparatus as claimed in claim 9, wherein the wheel has a predetermined center of gravity, and the outer and inner bearings are disposed symmetrically about the predetermined center of gravity, and the planet gear unit and the motor have a combined center of gravity according substantially with the center of gravity of the wheel, when the wheel is attached to the wheel rotating member.

11. The wheel rotating apparatus as claimed in claim 1, wherein the second diameter is smaller than the first diameter.

12. The wheel rotating apparatus as claimed in claim 11, wherein the sun gear has a third diameter, and the first diameter is smaller than the third diameter.

13. The wheel rotating apparatus as claimed in claim 1, wherein the inner gear is disposed outside the stator and the rotor in the axial direction of the wheel relative to the base and has an outer diameter smaller than an inner diameter of the stator.

14. The wheel rotating apparatus as claimed in claim 1, wherein the planet gear includes a gear shaft, as a rotation axis thereof, supporting the first and second gears, the planet gear unit includes a gear case and outer and inner bearings for rotatably supporting the gear shaft by the gear case, wherein one of the outer and inner bearings comprises a bearing for restricting a thrust movement of the gear shaft and the other of the outer and inner bearings comprises a bearing for allowing the thrust movement of the gear shaft.

15. The wheel rotating apparatus as claimed in claim 11, wherein the outer bearing comprises a bearing for allowing the thrust movement of the gear shaft and the inner bearings comprises a bearing for restricting the thrust movement of the gear shaft.

16. The wheel rotating apparatus as claimed in claim 14, wherein the outer bearings comprises a bearing for restricting the thrust movement of the gear shaft and the inner bearing comprise a bearing for allowing the thrust movement of the gear shaft.

17. The wheel rotating apparatus as claimed in claim 1, wherein the stator is disposed in the inside space in the radial direction of the wheel along the inner circumference of the rim, and the rotor is disposed inside the stator in the radial direction.

18. A vehicle comprising:
   a suspension connected to the base of the wheel rotating apparatus as claimed in claim 1.

* * * * *